March 12, 1968  M. H. GROVE ET AL  3,372,903
VALVE BODY CONSTRUCTION
Filed May 5, 1965  5 Sheets-Sheet 5
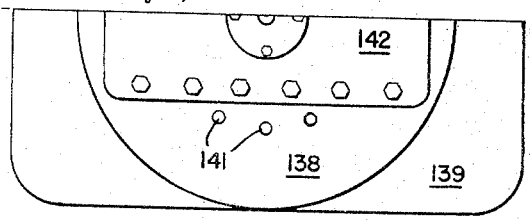
Fig_17
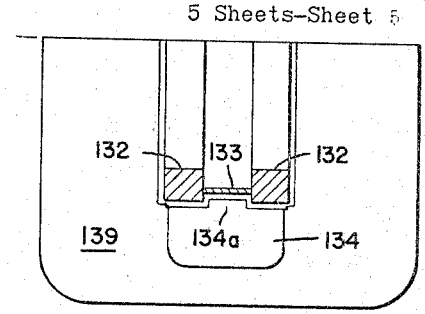
Fig_18
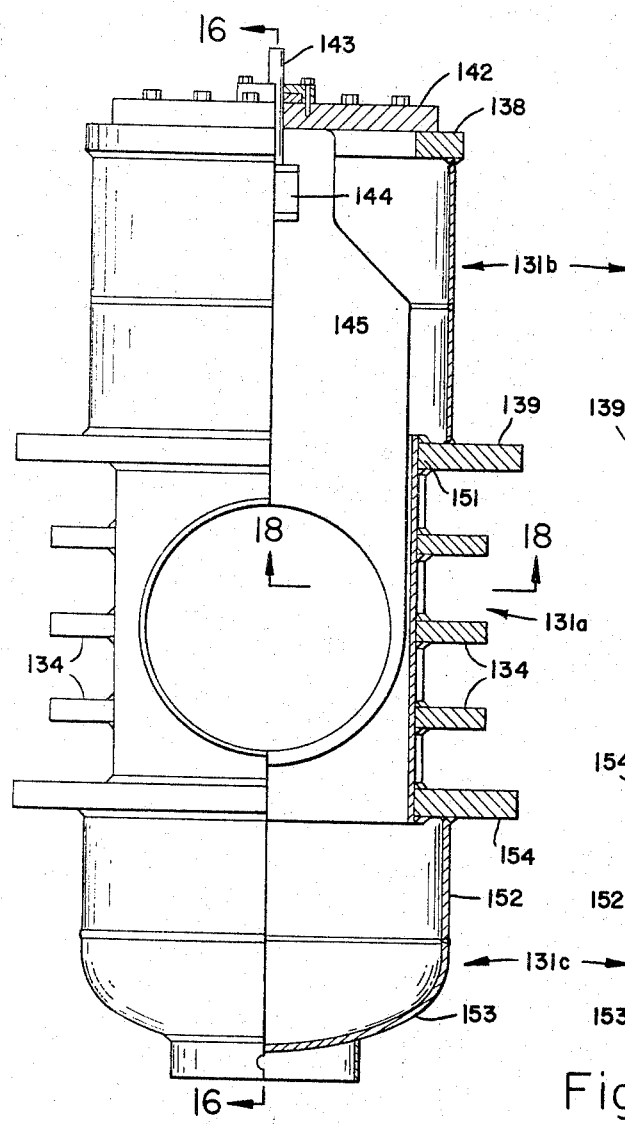
Fig_15
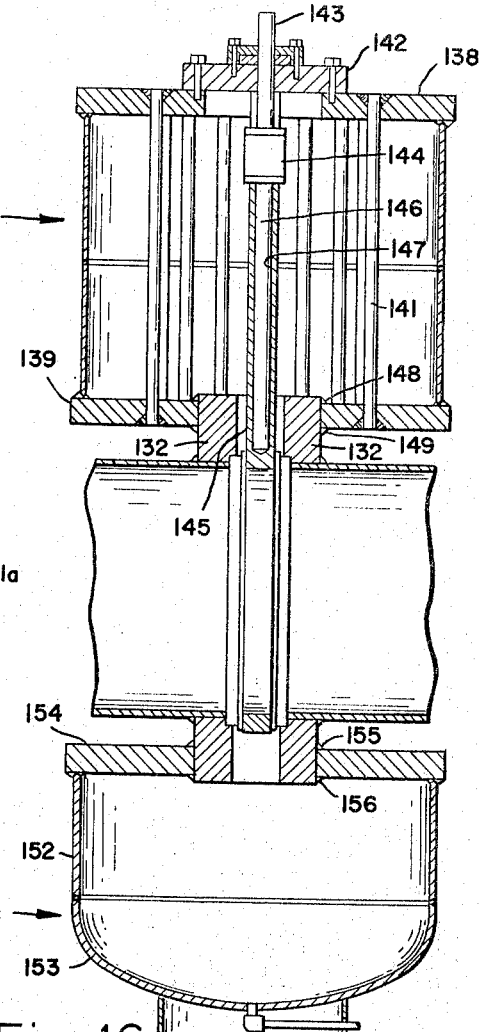
Fig_16
INVENTORS
MARVIN H. GROVE
KEE W. KIM
Flehr & Swan
ATTORNEYS

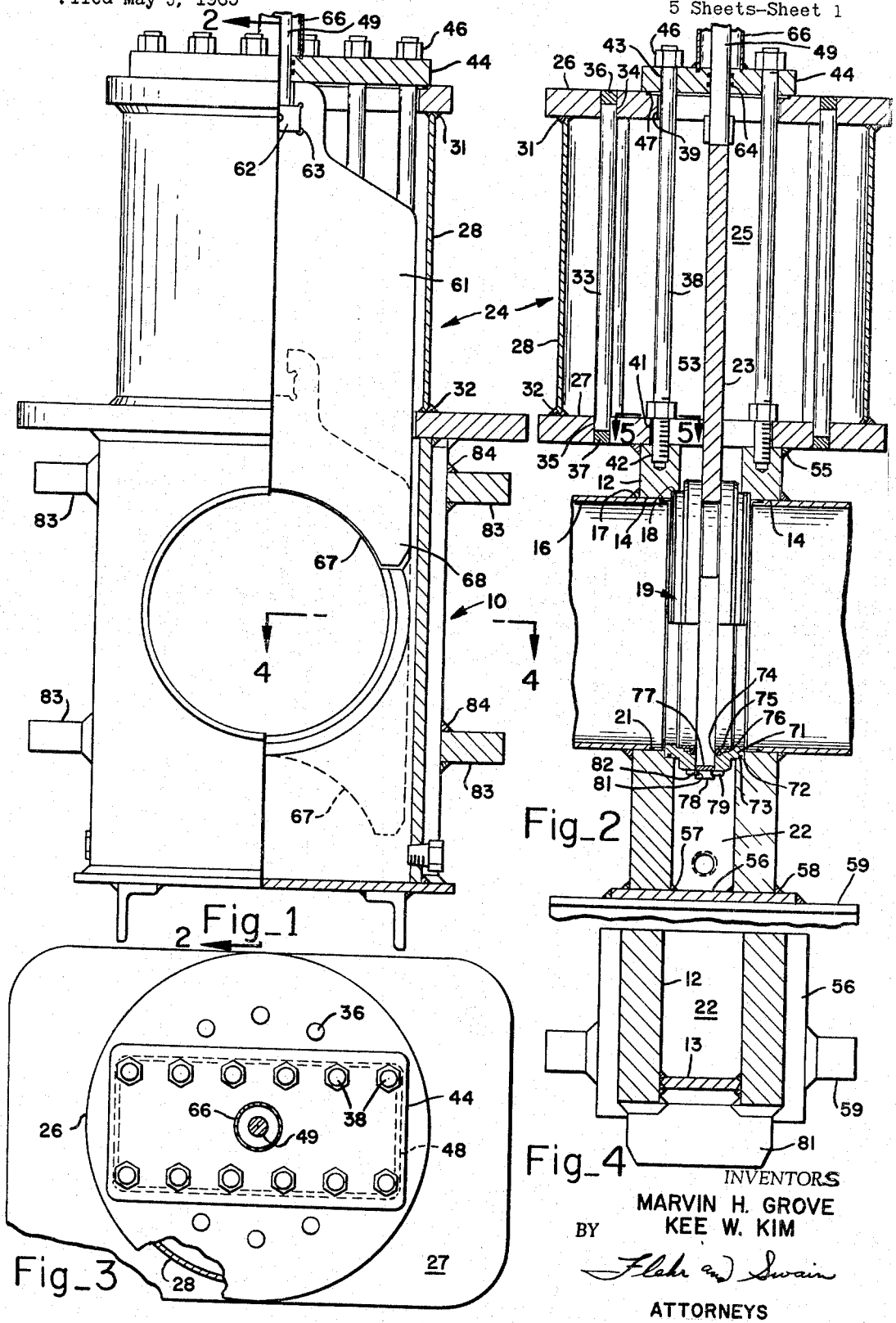

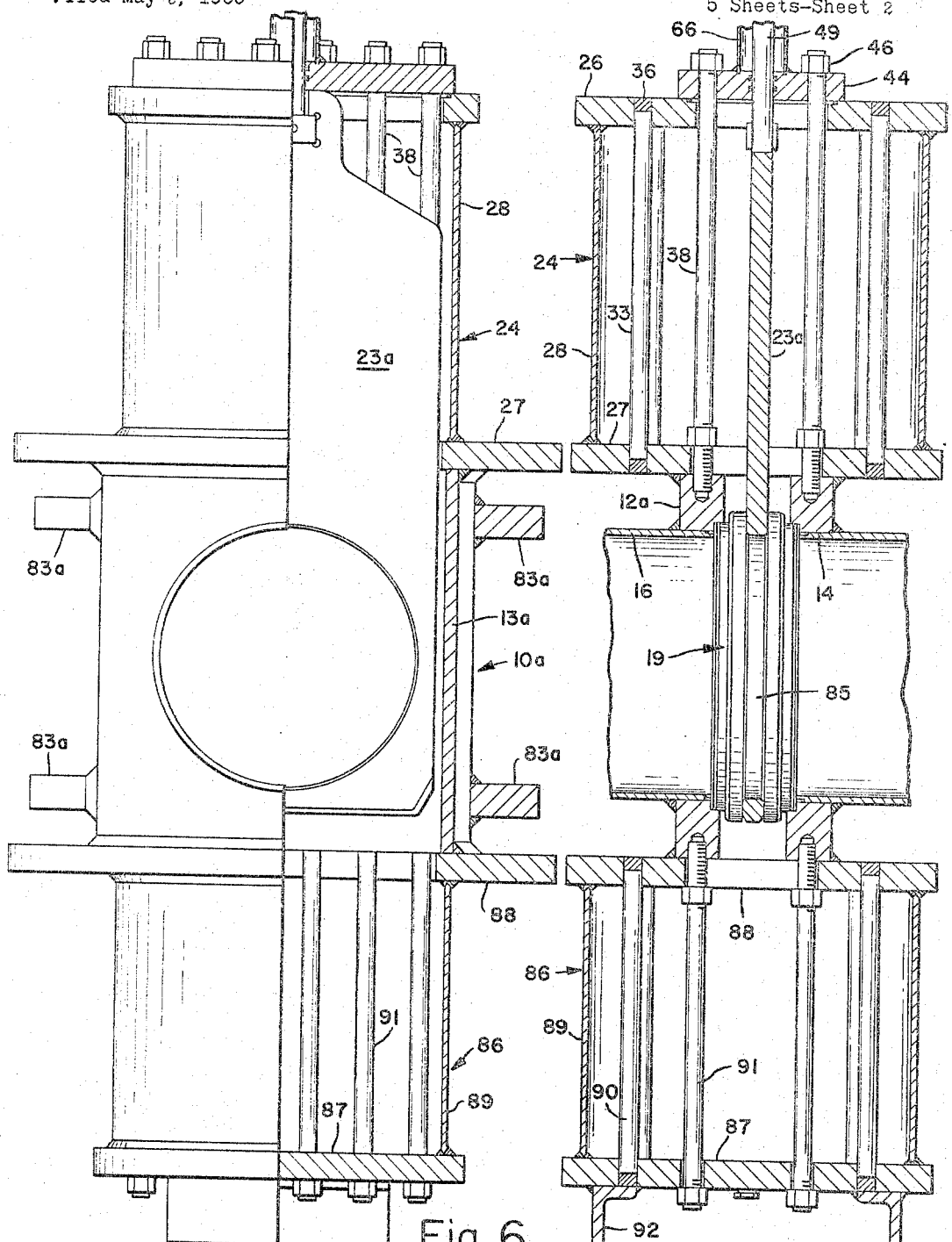
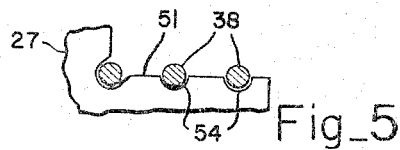
March 12, 1968  M. H. GROVE ET AL  3,372,903
VALVE BODY CONSTRUCTION
Filed May 5, 1965  5 Sheets-Sheet 2
Fig_5  Fig_6  Fig_7
INVENTOR.
MARVIN H. GROVE
KEE W. KIM
BY
ATTORNEYS March 12, 1968   M. H. GROVE ET AL   3,372,903
VALVE BODY CONSTRUCTION
Filed May 5, 1965   5 Sheets-Sheet 3
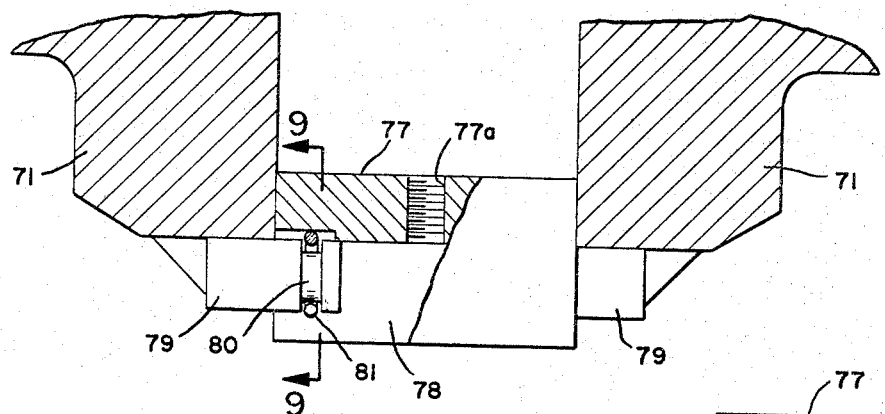
Fig_8
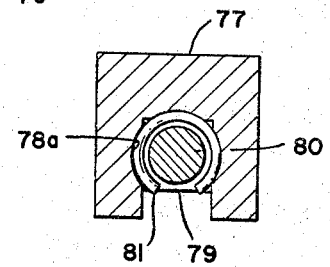
Fig_9
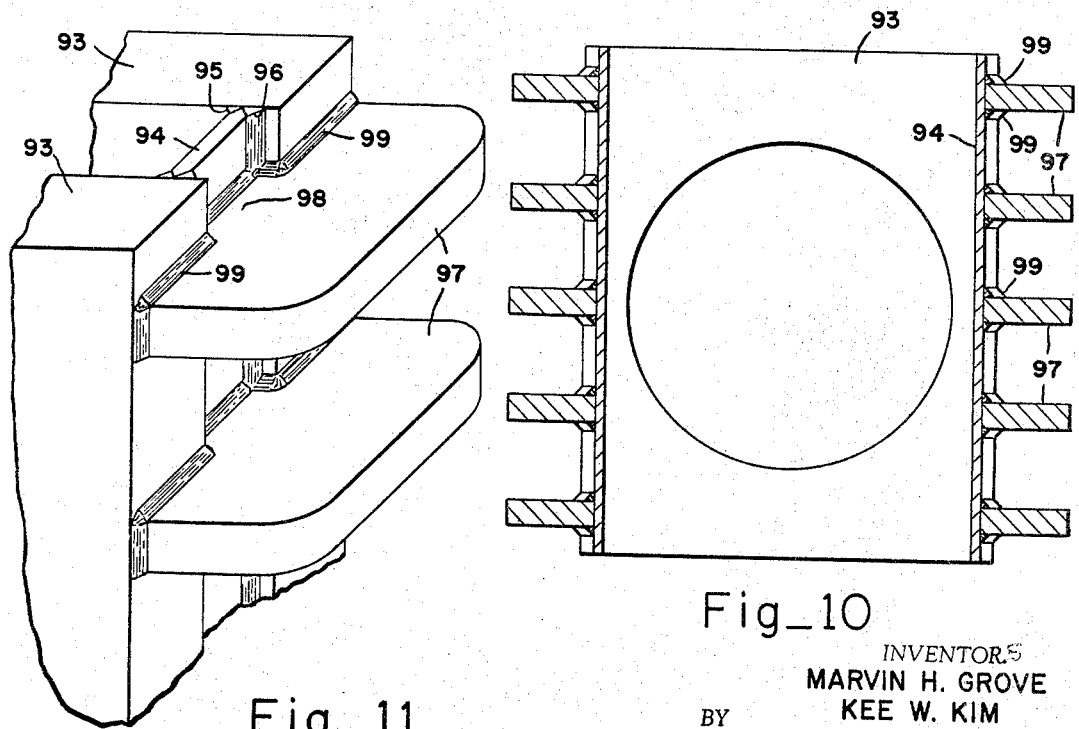
Fig_11   Fig_10
INVENTORS
MARVIN H. GROVE
KEE W. KIM
BY
ATTORNEYS

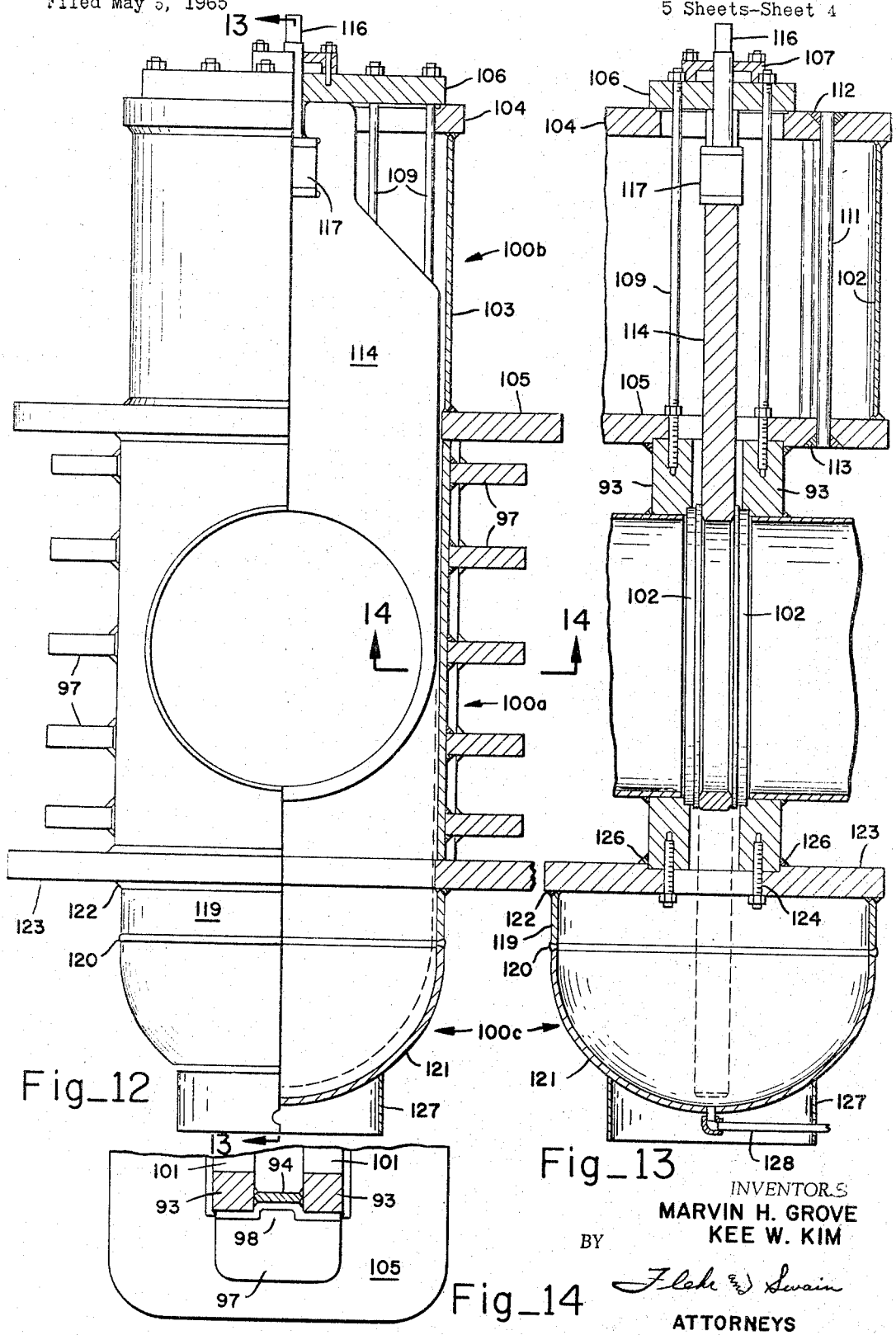

United States Patent Office 3,372,903
Patented Mar. 12, 1968

3,372,903
VALVE BODY CONSTRUCTION
Marvin H. Grove, Piedmont, Calif., and Kee W. Kim, Houston, Tex., assignors, by mesne assignments, to M & J Valve Company, Houston, Tex., a corporation of Delaware
Filed May 5, 1965, Ser. No. 453,377
7 Claims. (Cl. 251—329)

ABSTRACT OF THE DISCLOSURE

A gate valve in which the body consists of a box-like main body portion with at least one fabricated body extension made in the form of a pressure vessel.

---

This application relates generally to valves for controlling fluid flow. Particularly it is applicable to valves having bodies made by fabrication methods.

In the construction of gate valves of the fabricated body type, it has been common to form the main body section from structural steel shapes (e.g., plates, channels, angles, etc.) that are welded together to form a body which is box-like or rectangular in section. That end of the body which is normally the bottom of the valve is closed by welding on one or more closure plates. The other extremity, which normally forms the top of the valve, is provided with a suitable bonnet assembly. The flat end walls of such a body are susceptible to outward deflection upon application of internal body pressure, and therefore for the higher operating pressures it is necessary to reinforce the end walls, as by the use of stiffening ribs. Aside from machining and assembly costs, the cost of manufacturing such fabricated valve bodies depends upon a number of factors, including the weight of the metal employed, the welding time required, the amount of weld metal deposited, and the nature of the reinforcement (e.g., ribs) required.

In general, it is an object of the present invention to provide a fabricated gate valve construction which can be manufactured more economically than valves of the type described above.

Another object of the invention is to provide a gate valve of the fabricated body type which makes possible an effective saving in the weight of metal employed and in the welding and assembly operations required.

More specifically, it is an object of the present invention to provide a gate valve of the fabricated type which utilizes one or two body extensions which are annular in section and function as cylindrical pressure vessels.

Additional objects and features of the invention will appear from the following description in which the preferred embodiment has been set forth in detail in conjunction with the accompanying drawing.

Referring to the drawing:

FIGURE 1 is an end elevational view, partly in section, illustrating a valve in accordance with the present invention;

FIGURE 2 is a cross-sectional view taken along the line 2—2 of FIGURE 1;

FIGURE 3 is a top plan view of the valve shown in FIGURE 1, portions being in section;

FIGURE 4 is a cross-sectional detail taken along the line 4—4 of FIGURE 1;

FIGURE 5 is a detail taken along the line 5—5 of FIGURE 2;

FIGURE 6 is an end elevational view partly in section illustrating another embodiment of the invention;

FIGURE 7 is a side elevational view showing the valve illustrated in FIGURE 6;

FIGURE 8 is a detail in section, on an enlarged scale, illustrating the spacing means for the mounting rings of the sealing assembly;

FIGURE 9 is a cross-sectional detail taken along the line 9—9 of FIGURE 8;

FIGURE 10 is a side elevational view in section illustrating another embodiment of the main body portion;

FIGURE 11 is a perspective view illustrating a part of the main body portion of FIGURE 10, on an enlarged scale;

FIGURE 12 is an end elevational view in half section showing another embodiment of the invention;

FIGURE 13 is a side elevational view in section taken along the line 13—13 of FIGURE 12;

FIGURE 14 is a half cross-sectional view taken along the line 14—14 of FIGURE 13;

FIGURE 15 is an end elevational view in half section illustrating another embodiment of the invention;

FIGURE 16 is a side elevational view taken along the line 16—16 of FIGURE 15, with parts being broken away;

FIGURE 17 is a half plan view of the valve shown in FIGURES 15 and 16; and

FIGURE 18 is a half section taken along the line 18—18 of FIGURE 16.

The valve illustrated in FIGURES 1 and 2 consists generally of a main box-like body portion 10, together with an upper body extension portion. The main body portion 10 preferably is made from suitable structural steel shapes that are cut to the proper size and fabricated by welding. Thus, in this case relatively heavy flat plates 12 have their side margins secured by welding to the side walls 13. The plates 12 form end walls for the main body portion, and are provided with aligned openings 14 to form fluid flow passages. Pipe sections 16 are shown inserted in the openings 14, and are secured to the end walls 12 as by welding 17. The end plates 12 are shown provided with annular recesses 18 to accommodate the sealing assemblies 19. That end of each pipe section 16 which is adjacent the corresponding sealing assembly 19 can be machined to form a recess to accommodate the resilient seal element 21 of the O-ring type.

Although it is deemed preferable to make the body portion 10 by fabrication, in some instances this portion can be made by more conventional methods, as for example, by casting, with or without some fabrications. Thus the entire portion can be made as a single steel casting, or two or more parts may be made of castings assembled by welding to form the complete portion.

The main body portion formed as described above provides a main body space 22 for accommodating the valve gate 23. The space 22 is rectangular in section and extends between the top and bottom extremities of the main body portion. These extremities terminate in planes that are at right angles to the vertical or longitudinal axis of the valve body. Mounted upon the top extremity of the main body portion 10, there is the extension portion 24, the interior of which forms a space 25 that communicates with the main body space 22. Extension 24 preferably is made as a cylindrical pressure vessel, and as illustrated in FIGURES 1 and 2, it consists of top and bottom end walls 26 and 27, which can be in the form of plates, and which form closures for the extremities of the intermediate cylindrical section 28. The extremities of the cylindrical section 28 are shown sealed to the plates 26 and 27, as by means of the weld connections 31 and 32. The plate 27 is seated upon the top planar extremity of the main body portion 10.

The extension portion 24 is reinforced to enable the plates 26 and 27 to resist the internal pressures. In addition, the structure is reinforced and made more rigid whereby it has sufficient strength and rigidity to mount a valve operator. Thus a plurality of parallel reinforcing rods 33 extend between the plates 26 and 27, and are circumferentially spaced. During assembly their ends are extended through openings 34 and 35 in the plates 26 and 27 and thereafter plug welds 36 and 37 are applied to attach the ends of the rods 33 to the plates 26 and 27. In addition the rods 33, I have shown reinforcing rods 38 which extend through openings 39 and 41 in the plates 26 and 27. The lower portions 42 of the rods 38 are shown having threaded engagement with the upper portions of the end walls 12. The upper end of each rod 38 extends through an opening 43 in the bonnet plate 44 and is provided with a nut 46. Leakage between plate 26 and the bonnet plate 44 can be prevented by suitable means, such as the resilient seal ring 47 of the O-ring type. The bonnet plate 44 can be substantially rectangular as shown in FIGURE 3. Below this bonnet plate the plate 26 is cut away along the line 48, to provide a substantially rectangular shaped opening that accommodates the rods 38, and also accommodates the valve operating rod 49. As shown in FIGURE 5, the bottom plate 27 preferably is cut away along the line 51 with substantially semicircular loops 54 surrounding each rod 38. Clamping nuts 53 are threaded on each rod 38 and are tightened upon the plate 27, thus applying clamping forces to stiffen the rods and to aid in retaining the plate 27 upon the main body portion. The upper extremities of the end walls 12 are attached by weld connections 55 to the plate 27 whereby the plate 27 forms reinforcing ribs to reinforce the walls 12 against outward deflection. As shown particularly in FIGURE 3, the plate 27 is substantially rectangular in configuration, and the top plate 26 is circular.

In the embodiment shown in FIGURES 1 and 2, the lower end of the main body portion is provided with a simple closure. Thus a closure plate 56 is attached to the lower extremity, as by means of the internal and external welds 57 and 58. Foot elements 59, which may be short pieces of structural steel angle, are shown attached to the underside of plate 56.

The flat valve gate 23 normally is disposed between the sealing assemblies 19, and is movable between full open and closed positions. The upper end of the gate is attached to the operating rod 49 by suitable means, such as the head 62 which is secured to the lower end of the operating rod and which loosely interfits within the keyhole-shaped opening 63 formed in the upper end of the gate. Suitable means is provided to prevent leakage about the operating rod 49, such as the seal rings 64 of the resilient O-ring type. The bonnet plate can be employed to mount suitable valve operating means, such as a manual operator, or a power operator utilizing hydraulic or pneumatic pressure, or an electric motor. In the embodiment illustrated, the tube 66 is shown attached to the bonnet plate 44, and is employed to support the valve operating means. For example, where a simple manual operator is used, the upper portion of rod 49 may be threaded and engaged by a manually rotatable nut, with the thrust bearing for the nut being carried by the tube 66.

The shape of the gate 61 may vary in accordance with the service requirements. In this particular instance, the lower end of the flat gate is cut away along the arcuate line 67 (as shown in copending application S.N. 423,741), thereby providing depending gate portions 68. Full open position is shown in solid lines in FIGURE 1, and full closed position in dotted lines.

The sealing assemblies 19 may vary in construction in accordance with requirements, and to meet particular specifications. For example, sealing assemblies of the type shown in copending application S.N. 415,046 can be employed. As illustrated, each assembly consists of a metal mounting ring 71 which is fitted within an annular recess 72 formed in the corresponding end walls 12. Leakage between each mounting ring and the corresponding end wall is prevented by suitable means such as the seal ring 73 of the O-ring type. Each mounting ring 71 is recessed to accommodate the seal ring 74 made of suitable resilient material like nylon, which is secured to the metal carrier ring 75. Each seal ring is urged against the gate by a plurality of coil springs 76.

It is desirable to provide means for holding the lower portions of the mounting rings within the recesses 72. This holding means can be in the form of a block 77 which is provided with a groove or tunnel 78 on its lower side and which is adapted to be clipped over the projecting ends of lugs 79. The lugs 79 can be made square as illustrated, and are shown provided with annular grooves 80 for loosely retaining the split spring rings 81. For the normal position of spacer block 77 shown in FIGURE 8, the split spring rings 81 are accommodated within the bores 78a that are formed at the ends of the tunnel 78. Thus when the block 77 is forced downwardly over the projecting end portions of the lugs 79, the split spring rings 81 are squeezed and then permitted to expand within the annular bores 78a, thereby retaining the spaced block in normal position. When it is desired to remove the spacer to permit the removal of the mounting rings 71, the block 77 can be engaged by a suitable tool that is threaded into the opening 77a, and thereafter upward force applied to the block serves to remove it from the lugs 79.

It will be evident that various types of reinforcement can be used for the main body portion 10. Thus I have shown tie ribs 83 extending across the sides of the body and secured thereto by welding 84. Also, if desired, one or more ribs can be placed across the external faces of the end walls 12, although ordinarily this is not necessary.

The valve construction described above has a number of desirable features. Because the extension portion 24 is essentially a cylindrical pressure vessel, its side walls are made relatively light for a given operating pressure. The rods 33 are relatively light in construction and serve to reinforce the end plates 26 and 27 against internal pressure. The rods 38 are likewise relatively light, and they serve not only to reinforce the plates 26 and 27 against internal pressure, but in addition serve to stiffen the body assembly and provide sufficient strength and rigidity for the mounting of valve operators. The plate 27 serves not only as one wall of the extension portion, but in addition functions as a stiffening rib to reinforce the end walls 12 of the main body portion against outward deflection.

In general, a valve can be constructed as described above at relatively low manufacturing cost, taking into account the weight of metal employed for a given operating pressure, and the labor involved for welding, machining and assembly. No ribbing is required for reinforcing the body extension portion. If any ribbing is required for the main body portion, it can be relatively simple as described above.

In the embodiment of the invention illustrated in FIGURES 6 and 7, the gate 23 is of the through-port type, being provided with a circular port 85 which registers with the flow passages for full open position. The main body portion 10a in this instance is made symmetrical instead of being extended downwardly in length, or in other words, the openings through walls 12a are equally spaced from the upper and lower extremities of the main body portion. The upper body extension portion 24 is the same as described with reference to FIGURES 1 and 2. In addition to the extension portion 24, we provide a second lower extension portion 86 which has substantially the same construction, except that it does not carry bonnet means. Thus the bottom extension includes the end closure plates 87 and 88, together with the cylindrical section 89. The plates 87 and 88 are reinforced by the rods 90 and 91, which correspond to the rods 33 and 38. Rods 90 are similarly attached to the plates 87 and 88, and rods 91 are similarly threaded into the end walls 12 of the main body. Structural angles 92 are shown welded upon the plate 85 to form supporting feet.

It will be evident that the embodiment of FIGURES 6 and 7 incorporates the same principles as the first described embodiment. However, in FIGURES 6 and 7, the two extension portions provide body space extensions adequate for accommodating full movement of the ported gate in moving between full open and closed positions.

FIGURES 10 and 11 show another embodiment for the main body portion. In this instance the relatively heavy plates 93 form the end walls and correspond to the end walls 12a of FIGURE 7. These end walls are joined to the side walls 94 by the welds 95 and 96. Walls 94 correspond to the side walls 13a of FIGURE 6. In place of using ribs corresponding to the ribs 83a of FIGURE 6, ribs 97 are provided which are shaped to provide extensions 98. These ribs are attached to the sides of the main body portion by weld connections 99 that extend between the ribs 97 and the side edges of the plates 93 and also between the portions 98 and the side walls 94 as illustrated in FIGURE 11. As shown in FIGURE 10, a plurality of such ribs can be provided and vertically spaced to provide the strength and rigidity desired.

In general, ribs of the type shown in FIGURES 10 and 11 are more effective in strengthening the main body portion than the ribs 83 or 83a applied in the manner shown in FIGURES 1 and 6. This is because the weld connections 99 extend not only across the side edges of the walls 93, but in addition across the walls 94 as shown in FIGURE 11. It may be explained that without any ribs attached to the sides of the main body portion, there is a tendency for stresses on the side wall due to internal fluid pressure to be applied mainly as bending stresses on the weld connections. However, when the ribs 97 are applied in the manner shown in FIGURES 10 and 11, only a minor part of the stress is applied as bending stress to the weld connections between the walls 93 and 94, and the majority of the stress is applied to the weld connections in tension. The walls are better able to resist stresses applied in tension and, therefore, the main body portion is greatly strengthened without use of excess reinforcing metal.

The embodiment illustrated in FIGURES 12–14 is a through-port valve, and the body comprises a main body portion 100a together with the upper and lower extension portions 100b and 100c. Portion 100a is made substantially as illustrated in FIGURE 10. In other words, it is constructed from relatively heavy plate-like walls 93 which are attached by welding to the side walls 94 (FIGURE 14). Also the main body portion is reinforced by the ribs 97 having portions 95 and secured by welding in the manner illustrated in FIGURE 11. The end walls 93 have aligned openings 101 which may be recessed to accommodate the sealing assembly 102. The upper extension 100a is somewhat similar to the upper extension 24 of FIGURES 6 and 7. The cylindrical section 103 has the upper and lower closure plates 104 and 105 attached to the same by welding and plate 105 is also attached by welding to the upper end of the main body portion 100a. A bonnet plate 106 is disposed on the plate 104 and is provided with a thrust bearing assembly 107 forming a thrust bearing for the operating rod 116. The bonnet plate 106 is sealed with respect to plate 104 and is engaged by the upper ends of the clamping rods 109, the lower ends of these rods being threaded into the end walls 93. The reinforcing rods 111 are attached at their ends to the plates 104 and 105 by the welding connections 112 and 113.

The valve gate 114 is shown connected at its upper end to the valve operating rod 116. The nut 117 in this instance may be internally threaded or otherwise formed to engage threads on the rod 116, with the gate being provided with an extended bore within which that portion of the rod 116 extending below the nut 117 is accommodated.

The extension 100c at the bottom end of the body consists of a cylindrical shaped portion 119 attached as by welding connection 120 to a dome shaped potrion 121. The cylindrical portion 119 is attached by weld connection 122 to the closure plate 123. Plate 123 is seated upon the lower end of the main body portion and is secured thereto by stud bolts 124 and weld connections 126. The dome portion 121 is shown provided with a welded-on cylindrical shaped foot 127 and may also be provided with a drain pipe connection 128.

In general, the embodiment of FIGURES 1–14 operates in the same manner as the embodiment of FIGURES 6 and 7. However, the main body portion is reinforced by means illustrated in FIGURES 10 and 11, and the lower extension consists of a dome together with a short cylindrical section, instead of being cylindrical with flat ends. Although it is preferable to utilize an upper extension which is substantially cylindrical with flat ends to facilitate mounting the bonnet plate, it will be evident that if desired the upper extension may likewise be dome shaped.

The embodiment shown in FIGURES 15–18 is somewhat similar to the embodiment of FIGURES 12–14. However, the mounting of the top and lower extensions on the main body portion is simplified. The body in this instance comprises the main body portion 131a, the upper body extension 131b, and the lower body extension 131c. Portion 131a is similar to the body portion 100a of FIGURE 12. It includes the relatively heavy platelike end walls 132 forming the ends of the body, together with the lighter side walls 133. The sides of the main body portion are provided with ribs 134 corresponding to the ribs 97 of FIGURE 12, and likewise secured to the walls of the main body portion by welding 136.

The upper body extension 131b includes the cylindrical part 137 attached at its ends to the closure plates 138 and 139. Plate 138 can be circular in plan and plate 139 is generally rectangular, as shown in FIGURE 17. The upper plate 138 is shown attached to the lower plate 139 by the tension rods 141. Closure plate 138 mounts the bonnet plate 142 through which the operating rod 143 extends, the plate and its relationship to the operating rod being the same as in FIGURES 12 and 13. A nut 144 engages the valve gate 145 and has threaded engagement with the inner threaded portion 146 of the operating rod. That portion of this rod below the nut 144 is accommodated in the gate bore 147.

Although plate 139 corresponds with plate 105 of FIGURE 12, in this instance the inner part of the plate is cut away whereby the plate can be positioned about the upper end of the main body portion 131a. Upper and lower welds 148 and 149 serve to firmly secure plate 139 to the main body walls. Plate 139 also has side extensions 151 which are welded to the side walls 133 and correspond generally to the extensions 134a of the ribs 134.

The lower extension 131c has a somewhat similar attachment to the main body portion 131a. It consists of the cylindrical and dome shaped parts 152 and 153 that are welded together and attached by welding to the plate 154. Plate 154 is again cut away to fit about the lower end of the main body portion 131a and is secured thereto by the upper and lower weld connections 155, 156.

It will be evident that the embodiment of FIGURES 15–18 is somewhat simpler than the embodiment of FIGURES 12–14. The plates 139 and 154 provide rigid connections to the upper and lower ends of the main body portion, and in addition they reinforce the end walls of the main body portion against outward deflection under internal fluid pressure.

It will be evident that the terminology used in the foregoing description is applicable when the valve is normally positioned with the axis of the flow passages horizontal and the bonnet uppermost. However, the valve can be installed in other positions, such as with the flow axis vertical, or inverted.

We claim:

1. In a gate valve construction, a main valve body portion comprising substantially flat spaced end walls secured at their side edges to side walls, said end walls having aligned openings forming flow passages, said main body portion being box-like and substantially rectangular in section, with planar top and bottom extremities, means forming a bottom closure for said main body portion, an extension body portion secured to the top extremity of the main body portion said extension portion being a pressure vessel comprising top and bottom spaced closure walls together with a substantially cylindrical section interposed between said walls, the bottom closure wall being seated on the top extremity of the main body portion, the axis of the cylindrical section being aligned with the longitudinal axis of the main body portion, the space within said extension portion being in communication with the space within the main body portion, reinforcing rods extending between the closure walls of said extension structure and secured to the main body portion, bonnet means carried by the top closure wall of the extension portion, a gate enclosed within the main body portion and the extension portion, and operating means extending through the bonnet means and connected to the gate.

2. In a gate valve construction, a main valve body portion comprising substantially flat spaced end walls secured at their side edges to side walls, said end walls having aligned openings forming flow passages, a body extension portion secured to the top extremity of the main body portion, closure means secured to the bottom extremity of the main body portion, said extension portion comprising a pressure vessel including top and bottom substantially circular plates together with a substantially cylindrical section interposed between said plates, said plates being sealed with respect to the upper and lower extremities of said cylindrical section, the bottom plate being in juxtaposition with and secured to the top extremity of the main body portion, a bonnet plate positioned upon said top plate, reinforcing rods extending through said top and bottom plates and said bonnet plate, the lower extremities of said rods being attached to the main body portion, a gate disposed within the main body portion and the extension portion, and an operating member extending through the bonnet plate and attached to said gate.

3. A valve construction as in claim 2 in which the end walls of the main body portion have weld connections with the bottom closure plate of the extension portion.

4. In a gate valve construction, a main valve body portion comprising substantially flat spaced end walls secured at their side edges to side walls, said end walls having aligned openings forming flow passages, said main body portion being box-like and substantially rectangular in section with substantially planar top and bottom extremities, means forming a bottom closure for said main body portion, an extension portion secured to the upper part of the main body portion, said extension portion being a pressure vessel comprising top and bottom spaced closure walls together with a substantially cylindrical section interposed between said walls, the bottom closure wall having an opening therein which accommodates the top part of the main body portion and being secured by welding to the end and side walls of the main body portion, the space within the extension portion being in communication with the space within the main body portion, bonnet means carried by the top closure wall of the extension portion, a gate enclosed within the main body portion and extension portion, and operating means extending through the bonnet means and connected to the gate.

5. In a gate valve construction, a main valve body portion comprising substantially flat end walls secured at their side edges to side walls, said end walls having aligned openings forming flow passages, said body portion being substantially rectangular in section, means forming a bottom closure for said main body portion, a body extension portion mounted on the top of the main body portion and comprising a pressure vessel having a substantially cylindrical section and top and bottom closure members secured to said cylindrical section, said body extension portion forming a closed body space extension that is in communication with the main body space, the bottom closure wall being secured to the upper end of the main body portion, bonnet means mounted upon the top closure wall of said body extension portion, a valve gate disposed within the body portions and movable between open and closed positions relative to the flow passages, an operating member extending through the bonnet means and connected to the gate, and reinforcing rods extending between the closure walls of the body extension portion.

6. In a gate valve construction, a main valve body portion comprising substantially flat spaced end walls secured at their side edges to side walls, said end walls having aligned openings forming flow passages, said main body portion being box-like and substantially rectangular in section with planar top and bottom extremities, means forming a bottom closure for said main body portion, an extension body portion secured to the top extremity of the main body portion, said extension portion being a pressure vessel comprising top and bottom spaced closure walls together with a section formed of curved walls interposed between said closure walls, the curved walls extending beyond the exterior surfaces of the flat end walls as the body is viewed in plan, the bottom closure wall being fixed to the top extremity of the main body portion, the axis of the cylindrical section being aligned with the longitudinal axis of the main body portion, the space within said extension portion being in communication with the space within the main body portion, reinforcing rods extending between the closure walls of said extension structure, bonnet means carried by the top closure wall of the extension portion, a gate enclosed within the main body portion and the extension portion, and operating means extending through the bonnet means and connected to the gate.

7. In a gate valve construction, a main valve body portion comprising substantially flat spaced end walls secured at their side edges to side walls, said end walls having aligned openings forming flow passages said main body portion being box-like and substantially rectangular in section with planar top and bottom extremities, means forming a bottom closure for said main body portion, an extension portion secured to the upper part of the main body portion, said extension portion being a pressure vessel comprising top and bottom spaced closure walls together with a section formed of curved walls and interposed between said closure walls, the bottom closure wall having an opening therein which accommodates the top part of the main body portion and being secured by welding to the end and side walls of the main body portion, the space within the extension portion being in communication with the space within the body portion, bonnet means carried by the top closure wall of the extension portion, a gate enclosed within the main body portion and extension portion, and operating means extending through the bonnet means and connected to the gate.

References Cited
UNITED STATES PATENTS

| 1,213,259 | 1/1917 | Redding | 251—329 X |
| 1,713,905 | 5/1929 | Kadlec | 251—327 X |
| 2,265,175 | 12/1941 | Kinzie et al. | 251—327 X |
| 2,634,945 | 4/1953 | Hobbs | 251—367 X |
| 2,904,306 | 9/1959 | Bryant | 251—329 X |
| 3,190,305 | 6/1965 | Schulze | 251—326 X |
| 3,204,929 | 9/1965 | Bryant | 251—329 |
| 3,265,354 | 10/1966 | Anderson | 251—329 |

M. CARY NELSON, *Primary Examiner.*

ARNOLD ROSENTHAL, *Examiner.*